April 22, 1952     J. M. PESTARINI     2,593,483

ELECTRIC POWER SYSTEM

Filed Dec. 12, 1946

INVENTOR
Joseph M. Pestarini
BY
Philip G. Hilbert
ATTORNEY

Patented Apr. 22, 1952

2,593,483

UNITED STATES PATENT OFFICE 2,593,483

ELECTRIC POWER SYSTEM

Joseph Maximus Pestarini, Staten Island, N. Y.

Application December 12, 1946, Serial No. 715,792
In Great Britain September 25, 1946

6 Claims. (Cl. 318—140)

This invention relates to an electric power system. An object of this invention is to provide an electric power system comprising two groups of electrical apparatus, the apparatus of one of the groups having operational characteristics at a given time complementary to the operational characteristics of the apparatus of the other group at the same time together with means interconnecting the groups of apparatus and controlling the transfer of energy between the groups.

The system operates periodically and during at least one phase of operation, the apparatus of one group supplies electric energy absorbed by apparatus of the other group and converted into kinetic energy and during a second phase said kinetic energy is converted by apparatus of the second mentioned group into electric energy supplied to the apparatus of the first mentioned group.

In the instant invention, each of the machines constituting one group have similar operational characteristics, as for example a combination of motors and hereinafter will be referred to as motors. On the other hand, the machines constituting the other group may have different operational characteristics, as for example, a combination of dynamos, metadynes and resistors and hereinafter will be referred to as electric devices.

A further object of the invention is to provide electric machines operating at variable speed and able to convert electric energy into kinetic energy and means to control such conversion independently of the voltage applied to the machines or independently of the current traversing the machines.

The metadyne, hereinafter referred to, has been described in many United States patents, see, Patents Numbers 2,055,240; 1,987,417; 2,038,380; 2,049,389; and 2,079,465. A more complete description thereof has been given in Revue Generale de l'Electricite, on March 8th and 15th, August 16th and 23rd, November 22nd and 29th and December 6th, 1930, Paris.

The amplifier metadyne, hereinafter mentioned, is described in the United States patent by the same inventor, entitled "Direct Current Electrical Generator" patented March 29, 1938, under number 2,112,604, and in the British Patent Number 420,167.

The invention is now described, reference being made to the accompanying drawings.

Figure 1:
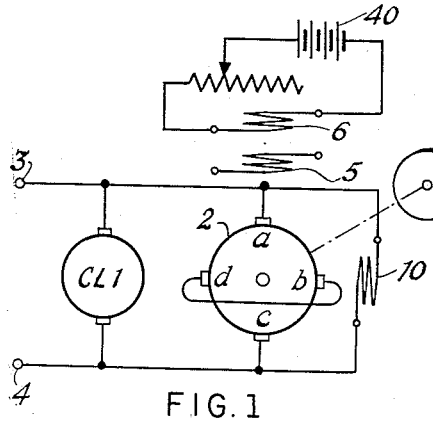
Figure 3:
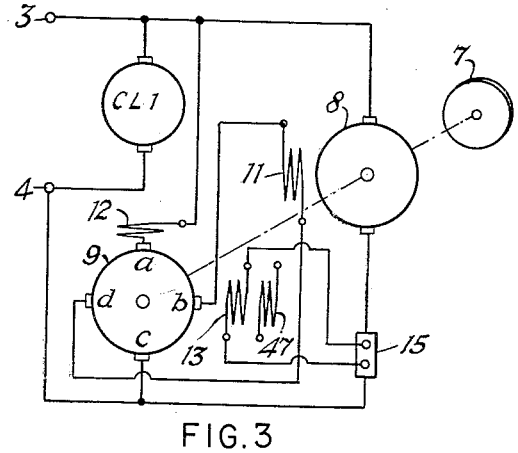
Figure 2:
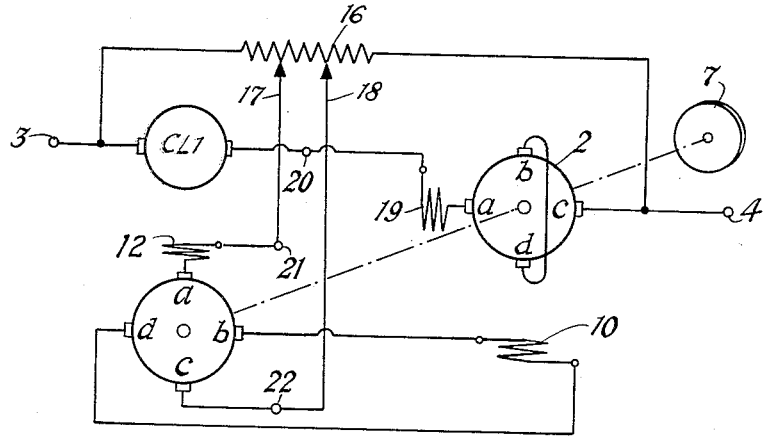
Figure 4:
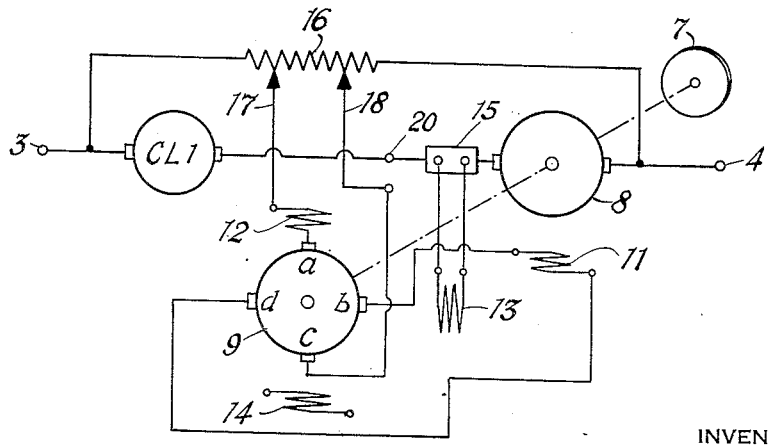

Figure 1 shows the interconnection of a motor metadyne provided with a flywheel and an electrical device having periodic operation; Figures 2, 3 and 4 show arrangements similar to that of Figure 1 and further including modified forms of the motor metadyne.

In Figure 1, a motor indicated by the symbol CLI is connected to the terminals 3 and 4 of an electric direct current source not shown. In parallel with the motor is a dynamo electric machine designated as a theta motor metadyne 2. The theta motor metadyne is characterized by having an armature and its commutator provided with a pair of non-consecutive primary brushes $a$, $c$ and a pair of non-consecutive short circuited secondary brushes $b$, $d$ together with stator windings 5, 6 having their magnetic axes coincident with the flux created by the current traversing the armature through the primary brushes, one of said stator windings being independently energized by means of a rheostat controlled battery 40. Another stator winding 10 is shunt connected across brushes $a$, $c$. The motor metadyne 2 is provided with a flywheel 7. The theta motor metadyne is further described in application, Serial Number 698,372.

If the windings 5 and 6 are not traversed by a current, a small primary current, traversing the primary brushes $a$ and $c$, creates between the secondary brushes $b$ and $d$ an electromotive force sufficient to create a large secondary current between the said brushes. The secondary current will create by its ampere turns a flux, inducing between the primary brushes $a$, $c$ can electromotive force sufficient to balance the voltage between the terminals 3 and 4 independent of the speed of the flywheel 7, provided the said speed is higher than a predetermined value. The stator winding 10 reduces the intensity of the secondary current between the short circuited brushes $b$, $d$.

It the windings 5 and 6 are traversed by a current, creating some resultant ampere turns, a primary current will traverse the brushes $a$ and $c$, sufficient for nearly compensating the resultant ampere turns created by the stator windings 5 and 6. Thus the theta motor metadyne 2 is adapted to supply or to absorb a primary current, which is closely controlled by the ampere turns of the stator windings 5 and 6 independent of the speed of the flywheel 7. If the value of the resultant ampere turns created by the stator windings 5 and 6 is kept constant, then the theta motor metadyne will absorb a practically constant primary current and therefore it will accelerate the flywheel. If the direction of the constant ampere turns created by the windings 5 and 6 is reversed, the theta motor metadyne will supply a practically constant primary current and the flywheel 7 will decelerate. Thus, the theta motor metadyne will either supply or absorb a practically constant current.

Assume the winding 5 is traversed by a current proportional to the current, say $I_1$, absorbed by the motor CL1, so adjusted as to cause the theta motor metadyne to supply the current $I_1$. Assume further that the stator winding 6 creates some constant ampere turns so adjusted as to cause the theta motor metadyne to supply the current $I_2$, then the theta motor metadyne will accelerate or decelerate at such a rate as to cause the direct current source, having its terminals at 3 and 4, to supply the constant current $I_2$.

Assume that the stator winding 6 is not energized and that the winding 5 is traversed by the same current as before, then the flywheel will be accelerated or decelerated by the theta motor metadyne so that the current supplied or absorbed by the motor CL1 will be then completely transformed into kinetic energy or respectively supplied by the theta motor metadyne.

In Figure 2, the motor CL1 is connected in series with a dynamo electric machine designated as a gamma motor metadyne $2a$. The gamma motor metadyne is characterized by having an armature and its commutator provided with a pair of non-consecutive primary brushes $a$, $c$ and and a pair of non-consecutive short circuited secondary brushes $b$, $d$, together with a stator winding 19 connected in series with the primary brushes and having its magnetic axes coincident with current traversing the armature through the primary brushes and a partly compensating said flux and another stator winding 10 having its magnetic axes coincident with the flux created by the current traversing the armature through its secondary brushes and being independently excited. The gamma motor metadyne is further described in application Serial Number 707,699.

The primary brush $a$ of the gamma motor metadyne is connected to the motor CL1 at point 20 and the other brush $c$ is connected to the terminal 4 of a direct current source. The stator winding 10 is connected to the secondary brushes $b$, $d$ of a special exciter metadyne 9, mechanically coupled with the gamma motor metadyne $2a$.

The exciter metadyne 9 has two non-consecutive primary brushes $a$, $c$ and two non-consecutive secondary brushes $b$, $d$. The metadyne 9 further includes a stator winding 12 connected in series with primary brushes $a$, $c$ and having its magnetic axis coincident with the flux created by the current traversing the armature through said brushes and creating a flux in the same direction as the last mentioned armature flux. If a voltage V is applied to the terminals 21 and 22 connected with the primary brushes $a$, $c$ of the exciter metadyne 9, the secondary current will create a secondary flux inducing an electromotive force between the primary brushes substantially balancing the imposed voltage V. If $n$ is the speed of the exciter metadyne, $I_b$ the secondary current entering the armature by the brush $b$, then omitting the Joule effect:

(A) $\qquad V = KnI_b$ where K is a constant. From equation (A) it follows that the secondary current $I_b$ will be inversely proportional to the speed $n$ and proportional to the voltage V. Thus the exciter metadyne 9 causes the gamma motor metadyne $2a$ to induce a voltage between its primary brushes $a$, $c$ proportional to the voltage V mentioned above, whatever may be the value of the speed $n$.

If V is made constant, the gamma motor metadyne $2a$ will induce a substantially constant voltage between the primary brushes. Assume that the voltage V is made equal to the difference between the voltage applied to the terminals 3 and 4 and the voltage induced by the motor CL1 by connecting the terminals 21 and 22 to the terminals 20 and 4, then the gamma motor metadyne $2a$ will substantially induce an electromotive force proportional to said difference of voltages. If the voltage applied to the terminals 3 and 4 is constant, the said arrangement will cause the gamma motor metadyne $2a$ to constantly supply the complement to the voltage induced by the motor CL1.

Assume that the terminals 3 and 4 are inserted in a loop supplied with a constant current, and that the terminals 21 and 22 are connected to the terminals 3 and 20, the total voltage absorbed by the motor CL1 and the gamma motor metadyne $2a$ may then be made zero and the kinetic energy transformed by the gamma motor metadyne into electric energy will suffice for supplying the electric energy to the motor CL1.

A resistor 16 connected across the terminals 3 and 4 and provided with two sliding contact members 17 and 18 adapted to be connected to terminals 21, 22, respectively, may form a potentiometer for controlling the operation of the gamma motor metadyne $2a$.

The rotors of the gamma motor metadyne $2a$ and the exciter metadyne 9, coupled together, will store kinetic energy. Any energy in excess of the storage capacity of motor metadyne $2a$ and exciter metadyne 9 may be stored in a flywheel 7 coupled to the gamma motor metadyne.

Figures 3 and 4 show the connections of a variable speed electric machine converting electric energy into kinetic energy and vice versa, connected with a motor CL1 and a direct current source indicated by its terminals 3 and 4. Said variable speed electric machine takes the form of a dynamo 8 having its field excitation 11 connected to the secondary brushes of an exciter metadyne 9. A flywheel 7 is coupled with the dynamo 8.

In Fig. 3 the motor CL1 is connected in parallel with dynamo 8 and the terminals 3, 4 of the direct current source. The primary brushes $a$, $c$ of the exciter metadyne 9 are connected at the terminals 3 and 4. A winding 12 is provided on the stator of the exciter metadyne and is series connected to the brushes $a$, $c$. In order to control the current supplied by the dynamo 8, the exciter metadyne 9 is provided with stator windings 13, 47. The winding 13 is energized by a current proportional to the armature current of the dynamo 8 obtained by means of a shunt 15 in the dynamo circuit. The winding 47 is independently energized by means of a rheostat controlled battery 40.

Assume the exciter metadyne 9 provides a current traversing the field winding 11 creating the necessary flux for inducing between the brushes of the dynamo 8 the electromotive force essentially balancing the voltage at the terminals 3 and 4, when the windings 13, 47 are not energized. Then the dynamo 8 will practically neither supply nor absorb current.

Assume now that the connections of the winding 13 has the effect of decreasing the current supplied by the dynamo 8, then if the winding 47 creates a constant number of ampere turns, the current supplied by the dynamo 8 will absorb or supply a constant current in one sense according to the direction of the current traversing the winding 47. By this means, the dynamo 8 is caused to supply or to absorb a given current provided the winding 47 is adequately energized, independently of the speed of the dynamo 8.

In Figure 4 the motor CL1 is connected in series with the dynamo 8 and the terminals 3, 4 of the direct current source. The exciter metadyne 9 operates by energizing the field winding 11 of the dynamo 8 in the manner described in connection with Figure 2.

The exciter metadyne 9 is shown provided with a stator winding 12 connected in series with brush $a$, and with a winding 13, energized by a current proportional to the armature current of the dynamo 8 obtained by means of shunt 15 in the dynamo circuit. The winding 12 is used to reduce the primary current and the winding 13 is used for causing the voltage induced by the dynamo 8 to be a desired function of its armature current.

I claim:

1. An electric power system comprising an electric motor, a source of electric energy, and at least one rotatable variable speed electric machine adapted to interchangeably transform electric energy into kinetic energy, said machine comprising an armature associated with a commutator having at least one pair of brushes, and at least one stator winding, means for connecting said pair of brushes in circuit with said motor and said source of energy, said stator winding being adapted to be energized to cause said machine to supply a current to said circuit having a value substantially independent of the rotational speed of said machine, wherein said machine comprises a set of primary brushes and a set of secondary brushes displaced therefrom, said secondary brushes being substantially short circuited, said primary brushes being connected in said circuit, said machine further comprising a pair of stator windings having their magnetic axes coincident with the axis of the flux created by the armature current traversing said primary brushes, one of said stator windings being adapted to be traversed by a current proportional to the current of said motor, the other of said stator windings being adapted to be simultaneously traversed by a current having an arbitrary value.

2. A power system as in claim 1 wherein said machine further comprises a third stator winding having its magnetic axis coincident with the axis of the flux created by the armature current traversing said secondary brushes, said third stator winding being connected across the primary brushes of said machine.

3. A power system comprising an electric motor, a source of electric energy, and at least one rotatable variable speed electric machine adapted to interchangeably transform electric energy into kinetic energy, said machine comprising an armature associated with a commutator having at least one pair of brushes, and at least one stator winding, means for connecting said pair of brushes in circuit with said motor and said source of energy, said stator winding being adapted to be energized to cause said machine to supply a current to said circuit having a value substantially independent of the rotational speed of said machine wherein said variable speed machines comprise a dynamo electric machine having an armature provided with a commutator including a set of primary brushes and a set of secondary brushes displaced therefrom, and a plurality of stator windings, said secondary brushes being substantially short circuited, and a second dynamo electric machine coupled to said first mentioned dynamo electric machine, said second dynamo electric machine having an armature provided with a commutator including a set of primary brushes and a set of secondary brushes displaced therefrom, means for connecting the primary brushes of said first mentioned dynamo electric machine in series circuit with said motor and said source of energy, one of the stator windings of said first mentioned dynamo electric machines having its magnetic axis coincident with the axis of the flux created by the armature current traversing the primary brushes of said first mentioned dynamo electric machine and being series connected in said series circuit for creating ampere turns partially compensating the ampere turns due to the current traversing the armature of said first mentioned dynamo electric machines through the primary brushes thereof, another of the stator windings of said first mentioned dynamo electric machines having its magnetic axis coincident with the axis of the flux created by the armature current traversing the secondary brushes of said first mentioned dynamo electric machine, said last mentioned stator winding being connected across the secondary brushes of said second mentioned dynamo electric machine, the primary brushes of said second mentioned dynamo electric machine being adapted to be supplied with a voltage having an arbitrary value for causing said first mentioned dynamo electric machine to supply to said circuit a voltage proportional to said first mentioned voltage independently of the rotational speed of said machines.

4. A power system as in claim 3 wherein said second mentioned dynamo electric machine includes a stator winding for creating ampere turns in the same direction as the flux created by the armature current traversing the primary brushes of said second mentioned dynamo electric machine.

5. A power system comprising an electric motor, a source of electric energy, and at least one rotatable variable speed electric machine adapted to interchangeably transform electric energy into kinetic energy, said machine comprising an armature associated with a commutator having at least one pair of brushes, and at least one stator winding, means for connecting said pair of brushes in circuit with said motor and said source of energy, said stator winding being adapted to be energized to cause said machine to supply a current to said circuit having a value substantially independent of the rotational speed of said machine, wherein said variable speed machines comprise a dynamo electric machine having an armature provided with a commutator including a pair of brushes, and a stator winding, and a second dynamo electric machine coupled to said first mentioned dynamo electric machine, said second dynamo electric machine having an armature provided with a commutator including a set of primary brushes and a set of secondary brushes displaced therefrom, and a plurality of stator windings, means for connecting the brushes of said first mentioned dynamo electric machine in parallel circuit with said motor and said source of energy, means for connecting the secondary brushes of said second mentioned dynamo electric machine to the stator winding of the first mentioned dynamo electric machine, the primary brushes of said second mentioned dynamo electric machine being adapted to be energized with a voltage proportional to the voltage of said motor, a pair of stator windings of said second mentioned dynamo electric machine having their magnetic axes in the same direction as the axis of the flux created by the armature current of the second mentioned dynamo electric machine traversing the secondary brushes thereof, one of said pair of windings being connected to said first mentioned dynamo electric machine to provide said winding with a current proportional to the armature current of said first mentioned dynamo electric machine, the other of said pair of windings being adapted to be energized with a current having a predetermined value whereby said first mentioned dynamo electric machine supplies a current having a predetermined value to said circuit, independently of the rotational speed of said machines.

6. A power system comprising an electric motor, a source of electric energy, and at least one rotatable variable speed electric machine adapted to interchangeably transform electric energy into kinetic energy, said machine comprising an armature associated with a commutator having at least one pair of brushes, and at least one stator winding, means for connecting said pair of brushes in circuit with said motor and said source of energy, said stator winding being adapted to be energized to cause said machine to supply a current to said circuit having a value substantially independent of the rotational speed of said machine wherein said variable speed machines comprise a dynamo electric machine having an armature provided with a commutator including a pair of brushes, and a stator winding, and a second dynamo electric machine coupled to said first mentioned dynamo electric machine, said second dynamo electric machine having an armature provided with a commutator including a set of primary brushes and a set of secondary brushes displaced therefrom, and a plurality of stator windings, means for connecting the brushes of said first mentioned dynamo electric machine in series circuit with said motor and said source of energy, means for connecting the secondary brushes of said second mentioned dynamo electric machine to the stator winding of said first mentioned dynamo electric machine, the primary brushes of said second mentioned dynamo electric machine being adapted to be supplied with a voltage having an arbitrary value, one of the stator windings of said second mentioned dynamo electric machine being connected to said first mentioned dynamo electric machine to be energized with a current proportional to the armature current of said first mentioned dynamo electric machine, another of the stator windings of said second mentioned dynamo electric machine being connected in series with one of the primary brushes of said second mentioned dynamo electric machine.

JOSEPH MAXIMUS PESTARINI.

REFERENCES CITED

The following references are of record in the file of this patent:

UNITED STATES PATENTS

| Number | Name | Date |
|---|---|---|
| 1,024,410 | MacFarlane | Apr. 23, 1912 |
| 1,530,172 | Hansen | Mar. 17, 1925 |